United States Patent [19]

Benjamin et al.

[11] 4,237,076

[45] Dec. 2, 1980

[54] TWO STAGE VACUUM BREAK

[75] Inventors: Benjamin C. Benjamin, Flint; Leon F. LaVene, Durand, both of Mich.

[73] Assignee: Schmelzer Corporation, Durand, Mich.

[21] Appl. No.: 24,967

[22] Filed: Mar. 29, 1979

Related U.S. Application Data

[62] Division of Ser. No. 776,533, Mar. 11, 1977, Pat. No. 4,181,065.

[51] Int. Cl.3 ........................ B01D 47/00; F01B 19/00

[52] U.S. Cl. ..................................... 261/23 A; 92/49; 92/64; 92/99; 92/129; 261/39 B

[58] Field of Search .................. 92/48, 49, 34, 64, 99, 92/100, 101, 117 A, 165 R, 65, 66, 105; 91/167 R; 251/61; 261/23 A, 39 B

[56] References Cited

U.S. PATENT DOCUMENTS

| | | | |
|---|---|---|---|
| 2,465,714 | 3/1949 | Elliot | 92/49 |
| 2,936,785 | 5/1960 | Hastings | 92/49 |
| 3,291,440 | 12/1966 | Archer | 251/61 |
| 3,659,500 | 5/1972 | Akman | 92/49 |
| 4,098,459 | 7/1978 | Benjamin | 261/23 A |

*Primary Examiner*—Abraham Hershkovitz

*Attorney, Agent, or Firm*—Fisher, Gerhardt, Crampton & Groh

[57] ABSTRACT

A two stage vacuum break or fluid motor device of the type used to control choke valves of internal combustion engine carburators. The motor uses a single diaphragm in which the fluid motor plunger operates in a first stage in response to movement of a portion of the diaphragm and in a second stage in response to movement of the entire diaphragm. The stages of movement are under the control of separate sources of manifold pressure which may be made available to the device independently of each other. The two stages of operation may be used to control one or more choke valves through a single output plunger or to control a pair of output plungers movable independently of each other.

4 Claims, 5 Drawing Figures

TWO STAGE VACUUM BREAK

This is a division of application Ser. No. 776,533 U.S. Pat. No. 4,181,065 filed Mar. 11, 1977.

This invention relates to fluid motors or vacuum break devices for controlling choke valves on internal combustion engines.

Vacuum break devices have been used with the carburetors of internal combustion engines on automobiles and usually two vacuum break devices are required, both of which may be designed for the particular model of engine and automobile on which the devices are used. This makes it necessary not only to have at least two vacuum break devices for each vehicle, but also to have a variety of types of vacuum break devices for different models of engines and for different models of vehicles.

It is an object of the invention to provide a single vacuum break device with two stages of operation which supplants the requirement of a pair of vacuum break devices and simplifies the linkage connection required to control the carburetor.

It is another object of the invention to provide a two stage vacuum break device with a single diaphragm member.

Still another object of the invention is to provide a two stage vacuum break with a single diaphragm member in which two stages of movement are under the control of separate and independently available sources of vacuum.

A two stage vacuum break is contemplated for use with carburetors in which the vacuum break device is connected to separate sources of vacuum to operate a plunger successively in first and second stages. If desired, the separate sources of vacuum may be controlled by temperature responsive valves so that operation of one or both of the sources is delayed. Also, the vacuum break device is so arranged that separate plungers may be operated in the two stages with one plunger controlling one device and the other plunger controlling still another device.

Figure 1:
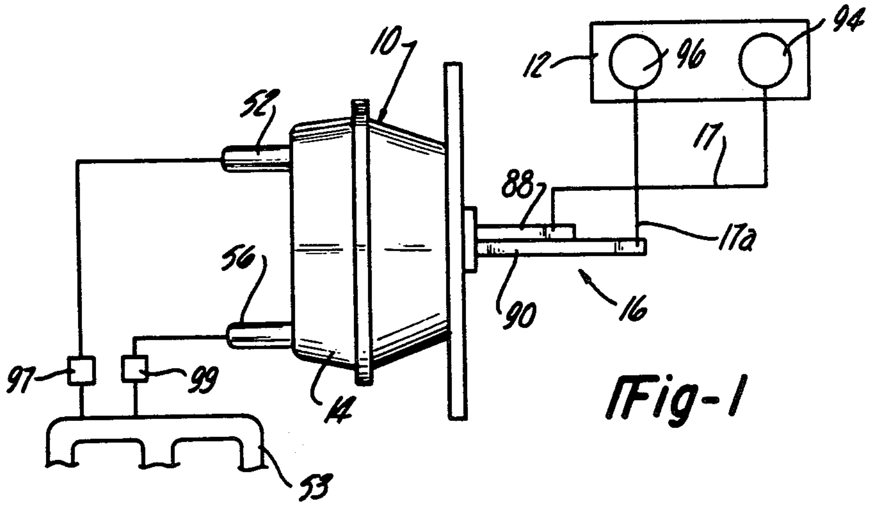
FIG. 1 is a diagrammatic view showing the installation of the vacuum break device embodying the invention.

Referring to the drawings, the vacuum break device embodying the invention is designated generally at 10 and is adapted to be supported on a carburetor 12. The vacuum break device 10 includes a housing 14 from which a movable plunger assembly 16 projects. The plunger or power output assembly 16 is adapted for connection to control linkages such as a choke valve control rods 17 and 17*a* of the carburetor 12.

Figure 2:
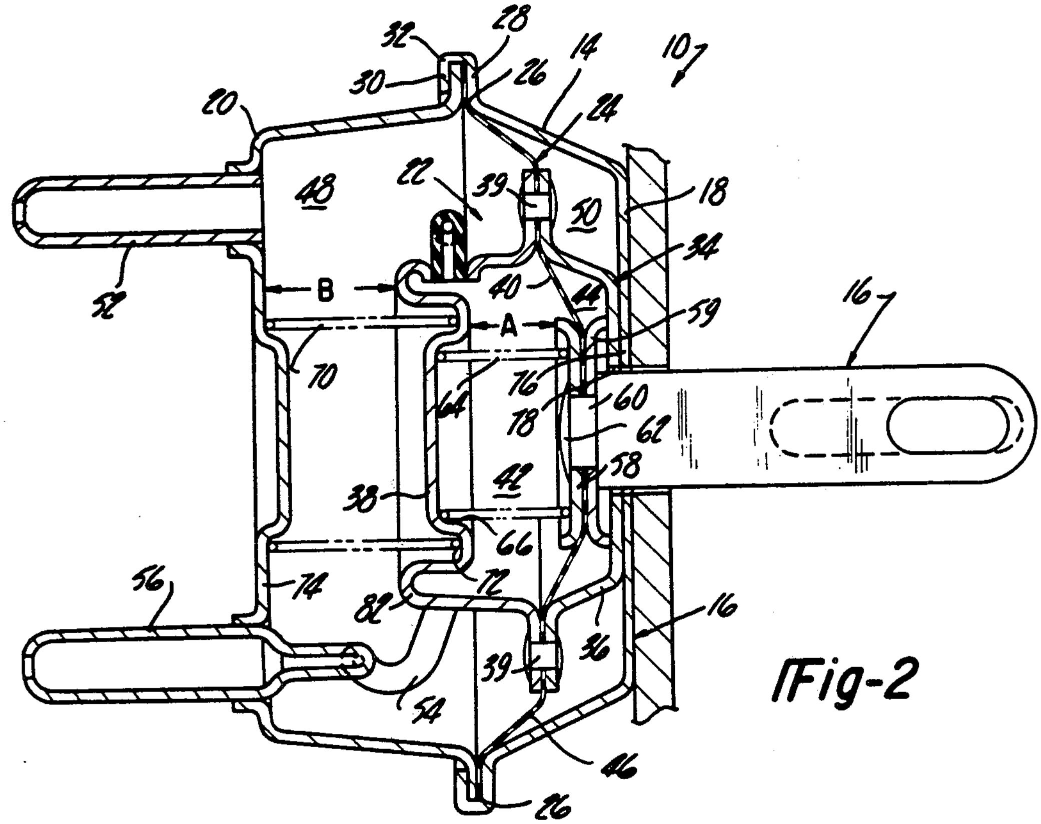
FIG. 2 is a cross-sectional view of the vacuum break device at an enlarged scale.
Figure 5:
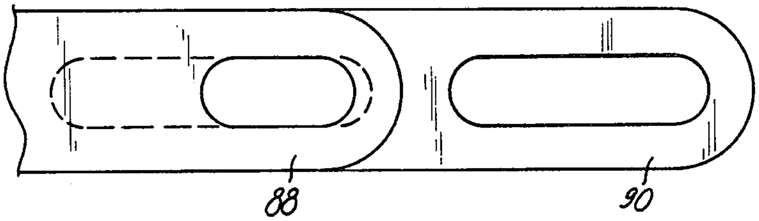
FIG. 5 is a side elevation of a portion of the structure shown in FIG. 3.

Referring to FIG. 2, the housing 14 of the vacuum break device 10 includes a front housing section or cover 18 and rear housing cover or section 20. Disposed within the housing 14 is a diaphragm assembly 22. The diaphragm assembly 22 includes a flexible diaphragm 24 which has its outer circumferential flange portion 26 clamped between circumferential flanges 28 and 30 of the front and rear covers, respectively. The flange 28 is folded over the flange 30 as indicated at 32 to form the housing 14 which may be considered the primary housing of the vacuum break device.

An auxiliary housing 34 is formed within the primary housing 14 by a front cup shaped member 36 and a rear cup shaped member 38 which are disposed on opposite sides of the diaphragm 24 and are connected thereto by rivets 39 which clamp the cup shaped members together to form the auxiliary chamber or housing 34. A central portion 40 of the diaphragm 24 is disposed within the auxiliary housing 34 and divides it into a pair of chambers 42 and 44. The annular diaphragm portion 46 exteriorly of the auxiliary housing 34 and the auxiliary housing itself divides the primary housing 14 into a pair of chambers 48 and 50.

The chamber 48 communicates with an inlet tube 52 which may be connected to a source of vacuum pressure such as the intake manifold 53 (FIG. 1) of an internal combustion engine. The chamber 42 within the auxiliary housing 34 communicates with a flexible conduit 54 which is coiled generally circumferentially around the auxiliary housing 34 and is connected to communicate with a vacuum inlet tube 56 formed in the wall of the rear cover 20. The inlet tube 56 may be connected to the same or to a different source of vacuum as the inlet tube 52. The central diaphragm portion 40 within the auxiliary housing 34 is provided with a pair of backing plates 58 and 59 which are held in position by a stem portion 60 of the plunger assembly 16 extending through the backing plates 58. The head 62 is upset like a rivet to hold the plates 58, 59 and diaphragm 24 together. A spring 64 has one end acting against the backing plate 58 and the other end seated in a recess 66 formed in rear cup shaped portion 38. The spring 64 serves to bias the auxiliary diaphragm portion and backing plate 58 to the right as viewed in FIG. 2 so that the backing plate 59 engages the forward or front cup shaped member 36.

A spring 70 is disposed axially of the housing 14 and has one end seated in a recess 72 formed in the rear cover of the auxiliary housing 34 and the other end seated against the rear wall portion 74 of the rear cover 20. The spring 70 serves to urge the auxiliary housing 34 fully to the right as viewed in FIG. 2 so that the front cover 36 is in abutting relationship with the front cover 18 of the primary housing 14.

The chamber 50 formed in the primary housing 14 communicates continuously with the atmosphere through an opening 76 formed in the front cover 18 of the housing. Similarly the chamber 44 in the auxiliary housing 34 has an opening 78 aligned with the opening 76. Opening 78 communicates with chamber 50 and opening 76 and therefore with the atmosphere.

In normal position prior to the application of any vacuum to the inlets 52 and 56 the parts of the vacuum break 10 occupy the position seen in FIG. 2. In that condition atmospheric pressure exists at opposite sides of the diaphragm portion 40 and in the chambers 42 and 44 so that the spring 64 is effective to urge the backing plates 58 and the plunger 16 to the right. Similarly, atmospheric air pressure exists in the chambers 48 and 50 at opposite sides of the annular diaphragm portion 46 and the spring 70 is effective to urge the auxiliary housing 34 and the annular diaphragm portion 46 to the right so that the cover plate 34 engages the front cover 18 of the housing assembly 22.

Upon admission of vacuum to the inlet tube 56, vacuum also is made available through the conduit 54 and in the chamber 42. The differential in pressure acting on the central diaphragm portion 40 due to vacuum pressure in chamber 42 and atmospheric pressure in chamber 44 causes the diaphragm to move to the left against the biasing action of spring 64 so that the plunger 16 also moves to the left. The full range of movement is indicated by the dimension A and is limited by the engagement of backing plate 58 with the rear cover 38 of the auxiliary housing 34 and at the opposite end of the stroke by engagement of plate 59 with the forward cover 36.

When the inlet tube 52 is subjected to vacuum, a differential pressure is established by vacuum pressure in the chamber 48 and atmospheric pressure in the chamber 50 so that the auxiliary housing 34 and the annular diaphragm portion 46 move to the left against the biasing action of spring 70 until an annular portion 82 engages the rear wall 74. During such movement vacuum pressure may be continued at the inlet tube 56 so that the plunger 16 is moved an additional amount as represented by the dimension B. The total movement of the plunger 16 becomes the sum of the dimensions A and B, one stage of movement being represented by the dimension A and the other stage of movement being represented by the dimension B.

If atmospheric pressure is maintained in the chambers 42 and 44 and the inlet tube 52 is subjected to vacuum pressure, the differential in pressure established in chambers 48 and 50 will cause the auxiliary housing 34 and the diaphragm portion 46 to move to the left while the backing plates 58 and 59 maintain their relative position to the auxiliary housing 34. In this instance the plunger 16 moves first through the distance represented by the dimension B. Subsequently, the application of vacuum pressure to the chamber 42 causes movement of the plunger in response to movement of the central diaphragm portion 40 to the left through the dimension represented by A.

Since the distances of travel indicated at A and B are different, the two different modes of operation make it possible to vary the length of stroke in the initial portion of the stroke and in the final portion of the stroke.

Figure 3:
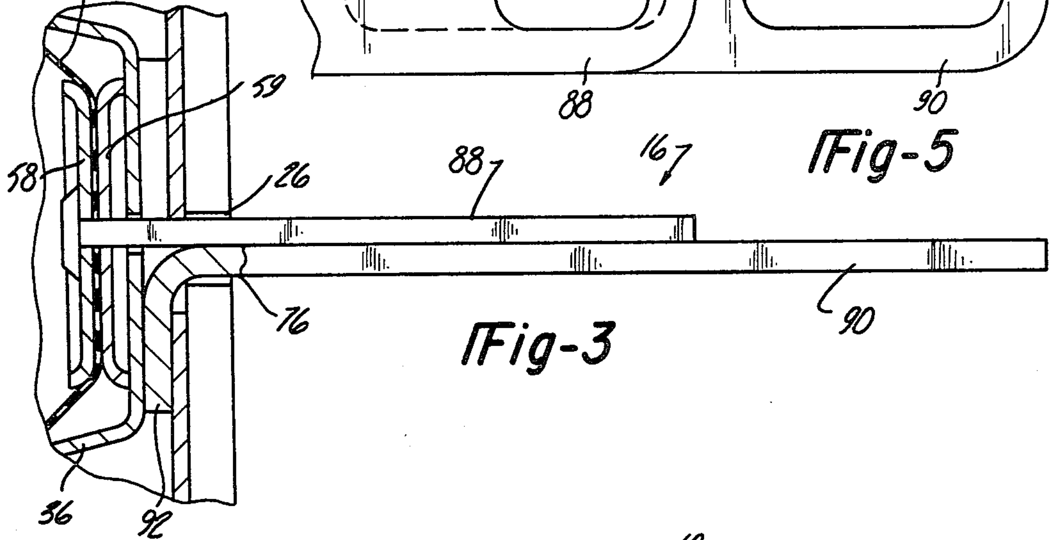
FIG. 3 is a view of a portion of the structure shown in FIG. 2 but modified to perform a different function.

Referring now to FIG. 3 an alternate arrangement of the plunger assembly 16 is illustrated in which a plunger 88 is connected to the central diaphragm portion 40 and the backing plates 58 and 59 as in the embodiment seen in FIG. 2. However, the auxiliary housing 34 and the annular diaphragm portion 46 are connected to another plunger 90 which is disposed in side by side relationship with the plunger 88. The plunger 90 extends through the openings 26 and has a bent end portion 92 which may be fastened to the front covers 36 of the auxiliary housing 34 by welding or the like. With this arrangement if vacuum is applied first to the inlet tube 56 and subsequently to the inlet tube 52, the plunger 88 will move first a distance equal to the dimension A while the plunger 90 remains stationary. Upon application of vacuum to the inlet tube 52 both the plunger 88 and 90 will move a distance equal to the dimension B. Consequently, the plunger 88 will have moved through the full stroke of dimension A and dimension B while plunger 90 will have moved only a distance represented by dimension B.

If vacuum is applied first to the inlet tube 52 and subsequently to the inlet tube 56, the plungers 88 and 90 will move first as a unit through a distance equal to the dimension B. The subsequent application of vacuum to the vacuum tube 56 will result in movement of the plunger 88 an additional distance represented by the dimension A.

Such arrangement as illustrated in FIG. 3 makes it possible to provide even a larger number of possibilities in the application of the vacuum break 10 by connecting the plungers 88 and 90 to different instrumentalities. For example, the plunger 88 might be connected to the primary choke valve 94 of the carburetor 12 and the plunger 90 might be connected to a secondary choke arrangement 96 as seen in FIG. 1 wherein a top view of the carburetor is illustrated diagrammatically. Additional operational variances may be achieved by controlling and timing the delivery of vacuum to the vacuum tubes 52 and 56. Such controls can be in the form of valves indicated at 97 and 99 in FIG. 1. The valves can operate in response to various changes in conditions such as temperature to communicate vacuum to inlet tubes 52 and 56 in sequence.

Simultaneous communication of vacuum to the inlet tubes 52 and 56 in the embodiment seen in FIG. 2 will result in the continuous movement of the plunger 16 through both stages of movement. Simultaneous application of vacuum to the inlets 52 and 56 with the double output member 88, 90 seen in FIG. 3 will result in simultaneous movement of the plungers 88 and 90 until the auxiliary housing 34 comes into engagement with the walls 74 and plate 58 engages wall 66. Various possibilities of operation can be achieved by varying the communication of vacuum to the vacuum break device 10.

Figure 4:
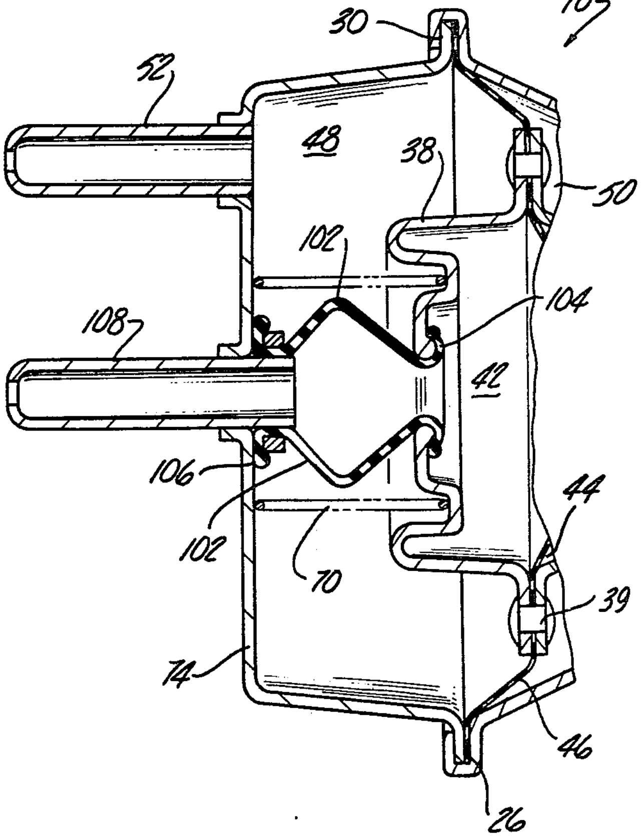
FIG. 4 is a view similar to FIG. 2 showing a modified form of the invention.

Another modification of the invention is shown in FIG. 4 in which vacuum communication with the actuating chamber 42 in the auxiliary housing 24 is afforded by a generally tubular bellows 102. The bellows 102 is disposed generally axially of the vacuum break 10 and has an annular bead at one end connected to the rear cover member 38 of the auxiliary housing 34. The opposite end of the bellows 102 has a beaded portion 106 connected to the end walls 74 to communicate with a vacuum inlet 108. The operation of this embodiment of the invention is the same as the embodiment in FIG. 2 in that constant or atmospheric pressure is maintained in the chambers 44 and 50 and variable pressure in the form of vacuum is communicated to the actuating chamber 42 independently of the vacuum pressure at the inlet stem 52. The bellows 102 like the coiled hose 54 in the embodiment seen in FIG. 2 affords another form of low resistance device for communicating variable pressure or vacuum to the movable auxiliary chamber 48 without unduly restricting movement of the auxiliary housing 34. Also, the vacuum break in FIG. 4 may be provided with the output plunger assembly seen in FIG. 2 or FIG. 3.

A two stage fluid motor or vacuum break device has been provided using a single diaphragm arrangement which is connected by way of two separate sources of vacuum to operate a output arrangement. If desired the stages may be imposed on a single plunger or separate plungers may be utilized, each operating in one of the two stages. The two stages of the vacuum break device is so arranged that the two sources of vacuum may be used separately to independently control a single device in two stages or two devices in separate stages.

The embodiments of the invention in which an exclusive property or privilege is claimed are defined as follows:

1. A charge forming system for an internal combustion engine comprising; a carburetor, a choke valve in the carburetor, said choke valve normally being urged to a closed position, a fluid motor connected to the choke valve and adapted to move it from a closed position toward an open position at a controlled rate, said fluid motor including a primary housing, an auxiliary housing disposed in said primary housing, a diaphragm, said diaphragm having a primary portion supporting said auxiliary housing for movement in said primary housing and forming a first vacuum chamber at one side and a first atmospheric pressure chamber at the other side of said auxiliary housing and primary diaphragm portion, said diaphragm having an auxiliary portion in said auxiliary housing forming a second vacuum chamber at one side and a second atmospheric pressure chamber at the other side of said auxiliary portion of said diaphragm, said first and second atmospheric pressure chambers being in constant communication with each other and said first and second vacuum chambers being isolated from each other, an output member connected to said choke valve and to said auxiliary portion of said diaphragm, resilient means urging said diaphragm and operatively connected choke valve to a closed position, said first vacuum chamber being connected to a first source of manifold vacuum pressure and said second vacuum chamber being connected to a second source of manifold vacuum pressure, means associated with said sources to communicate vacuum pressure to a selected one of said first and second vacuum chambers to move said output member and operatively connected choke valve from a closed position to an intermediate open position and to the other of said vacuum chambers to move said output member and choke valve from said intermediate open position toward a fully open position, a second choke valve normally being urged to a closed position, and an additional output member connected to said second choke valve and to said auxiliary housing for movement of said second choke valve to an open position upon establishment of vacuum pressure in said first vacuum chamber, said output members being disposed in parallel adjacent relation to each other for movement simultaneously and independently of each other.

2. The combination of claim 1 wherein said conduit means are formed by a flexible hose coiled generally circumferentially of said auxiliary housing and in said primary housing.

3. The combination of claim 1 wherein said conduit means is in the form of a bellows arranged axially of said housing to fold during movement of said auxiliary housing.

4. The combination of claim 1 in which said diaphragm forms pressure chambers opposite to said first and second actuating chamber, respectively, and in said primary and auxiliary housing, respectively, said chambers being in constant communication with each other and a source of constant pressure.

* * * * *